United States Patent
Kato et al.

(10) Patent No.: US 10,671,187 B2
(45) Date of Patent: Jun. 2, 2020

(54) PEN INPUT DEVICE SHEET AND METHOD FOR MANUFACTURING PEN INPUT DEVICE SHEET

(71) Applicant: Wacom Co., Ltd., Saitama (JP)

(72) Inventors: So Kato, Saitama (JP); Toshihiko Horie, Saitama (JP)

(73) Assignee: Wacom Co., Ltd., Saitama (JP)

( * ) Notice: Subject to any disclaimer, the term of this patent is extended or adjusted under 35 U.S.C. 154(b) by 111 days.

(21) Appl. No.: 16/100,004

(22) Filed: Aug. 9, 2018

(65) Prior Publication Data

US 2018/0348898 A1 Dec. 6, 2018

Related U.S. Application Data

(63) Continuation of application No. PCT/JP2016/057134, filed on Mar. 8, 2016.

(51) Int. Cl.
| | |
|---|---|
| G06F 3/046 | (2006.01) |
| G06F 3/0354 | (2013.01) |
| G06F 1/16 | (2006.01) |
| G06F 3/041 | (2006.01) |
| B32B 27/00 | (2006.01) |
| B32B 27/30 | (2006.01) |

(52) U.S. Cl.
CPC .......... *G06F 3/03545* (2013.01); *B32B 27/00* (2013.01); *B32B 27/30* (2013.01); *G06F 1/1643* (2013.01); *G06F 3/041* (2013.01); *G06F 3/046* (2013.01); *G06F 2203/04103* (2013.01)

(58) Field of Classification Search
CPC ........ G06F 1/1643; G06F 3/041; G06F 3/046; G06F 3/03545; B32B 27/00

USPC .................................................. 345/173, 179
See application file for complete search history.

(56) References Cited

U.S. PATENT DOCUMENTS

| | | | | |
|---|---|---|---|---|
| 2004/0001052 A1* | 1/2004 | Zank | ................... | G06F 3/03545 345/179 |
| 2004/0233178 A1* | 11/2004 | Silk | ....................... | G06F 1/3203 345/179 |
| 2006/0181525 A1* | 8/2006 | Larsen | ................ | G06F 3/03545 345/179 |

FOREIGN PATENT DOCUMENTS

| | | |
|---|---|---|
| JP | 2006-119772 A | 5/2006 |
| JP | 2014-137640 A | 7/2014 |
| JP | 2014-149817 A | 8/2014 |

* cited by examiner

*Primary Examiner* — Calvin C Ma
(74) *Attorney, Agent, or Firm* — Seed IP Law Group LLP

(57) ABSTRACT

A pen input device sheet, which contacts a tip part of a core body of an electronic pen for a pen input device, includes a resin film layer. A diameter of the tip part is SR. An amount of sinking of the resin film layer is $\delta$ and a coefficient of kinetic friction between the resin film layer and the tip part is $\mu$, which change according to a load when the tip part is in contact with the pen input device sheet. When the load applied to the tip part of the core body is changed and corresponding measurements are taken, and the measurements plotted with $\mu$ allocated to an ordinate axis and a ratio of $\delta/SR$ is allocated to an abscissa axis, a fitted straight line plotted based on the measurements has a proportional relation corresponding to a proportional relation between $\mu$ and the ratio of $\delta/SR$.

19 Claims, 12 Drawing Sheets

FIG.7

| DIAMETER OF PEN TIP OF BALLPOINT PEN | NUMBER OF PIECES OF PAPER | LOAD [gf] | COEFFICIENT μ OF KINETIC FRICTION | δ/SR | δ | REFERENCE SYMBOL |
|---|---|---|---|---|---|---|
| 0.5mm (SR=0.25) | ONE PIECE OF COPY PAPER | 50 | 0.23 | 0.11 | 0.0275 | |
| | | 100 | 0.23 | 0.14 | 0.035 | |
| | | 200 | 0.22 | 0.17 | 0.0425 | |
| | TWO PIECES OF COPY PAPER | 50 | 0.25 | 0.15 | 0.0375 | D |
| | | 100 | 0.27 | 0.21 | 0.0525 | |
| | | 200 | 0.30 | 0.28 | 0.07 | |
| | THREE PIECES OF COPY PAPER | 50 | 0.25 | 0.21 | 0.0525 | C |
| | | 100 | 0.28 | 0.28 | 0.07 | |
| | | 200 | 0.34 | 0.37 | 0.0925 | |
| | FOUR PIECES OF COPY PAPER | 50 | 0.26 | 0.25 | 0.0625 | B |
| | | 100 | 0.29 | 0.34 | 0.085 | |
| | | 200 | 0.35 | 0.45 | 0.1125 | |
| | FIVE PIECES OF COPY PAPER | 50 | 0.25 | 0.31 | 0.0775 | A |
| | | 100 | 0.29 | 0.40 | 0.1 | |
| | | 200 | 0.38 | 0.52 | 0.13 | |
| 1.0mm (SR=0.5) | ONE PIECE OF COPY PAPER | 50 | 0.14 | 0.04 | 0.02 | |
| | | 100 | 0.15 | 0.05 | 0.025 | |
| | | 200 | 0.16 | 0.07 | 0.035 | |
| | TWO PIECES OF COPY PAPER | 50 | 0.15 | 0.08 | 0.04 | |
| | | 100 | 0.15 | 0.10 | 0.05 | |
| | | 200 | 0.19 | 0.12 | 0.06 | |
| | THREE PIECES OF COPY PAPER | 50 | 0.15 | 0.10 | 0.05 | F |
| | | 100 | 0.16 | 0.13 | 0.065 | |
| | | 200 | 0.19 | 0.17 | 0.085 | |
| | FOUR PIECES OF COPY PAPER | 50 | 0.16 | 0.12 | 0.06 | |
| | | 100 | 0.16 | 0.15 | 0.075 | |
| | | 200 | 0.20 | 0.19 | 0.095 | |
| | FIVE PIECES OF COPY PAPER | 50 | 0.16 | 0.13 | 0.065 | E |
| | | 100 | 0.17 | 0.16 | 0.08 | |
| | | 200 | 0.20 | 0.21 | 0.105 | |

FIG. 10

| | HARDNESS | THICKNESS | RESIN FILM LAYER | SR | CORE BODY MATERIAL |
|---|---|---|---|---|---|
| SOLID LINE 301 | A96 | 2mm | POLYURETHANE & SILICONE | 0.7mm | POM |
| SOLID LINE 302 | A91 | 2mm | POLYURETHANE & SILICONE | 0.7mm | POM |
| SOLID LINE 303 | A73 | 2mm | FLUORINE RUBBER & SILICONE | 0.7mm | POM |
| SOLID LINE 304 | A70 | 2mm | POLYURETHANE & SILICONE | 0.7mm | POM |
| SOLID LINE 305 | A61 | 2mm | FLUORINE RUBBER & SILICONE | 0.7mm | POM |
| SOLID LINE 306 | A53 | 2mm | POLYURETHANE & SILICONE | 0.7mm | POM |
| DASHED LINE 401 | A96 | 1mm | POLYURETHANE & SILICONE | 0.7mm | POM |
| DASHED LINE 402 | A91 | 1mm | POLYURETHANE & SILICONE | 0.7mm | POM |
| DASHED LINE 403 | A73 | 1mm | FLUORINE RUBBER & SILICONE | 0.7mm | POM |
| DASHED LINE 404 | A70 | 1mm | POLYURETHANE & SILICONE | 0.7mm | POM |
| DASHED LINE 405 | A61 | 1mm | FLUORINE RUBBER & SILICONE | 0.7mm | POM |
| DASHED LINE 406 | A53 | 1mm | POLYURETHANE & SILICONE | 0.7mm | POM |

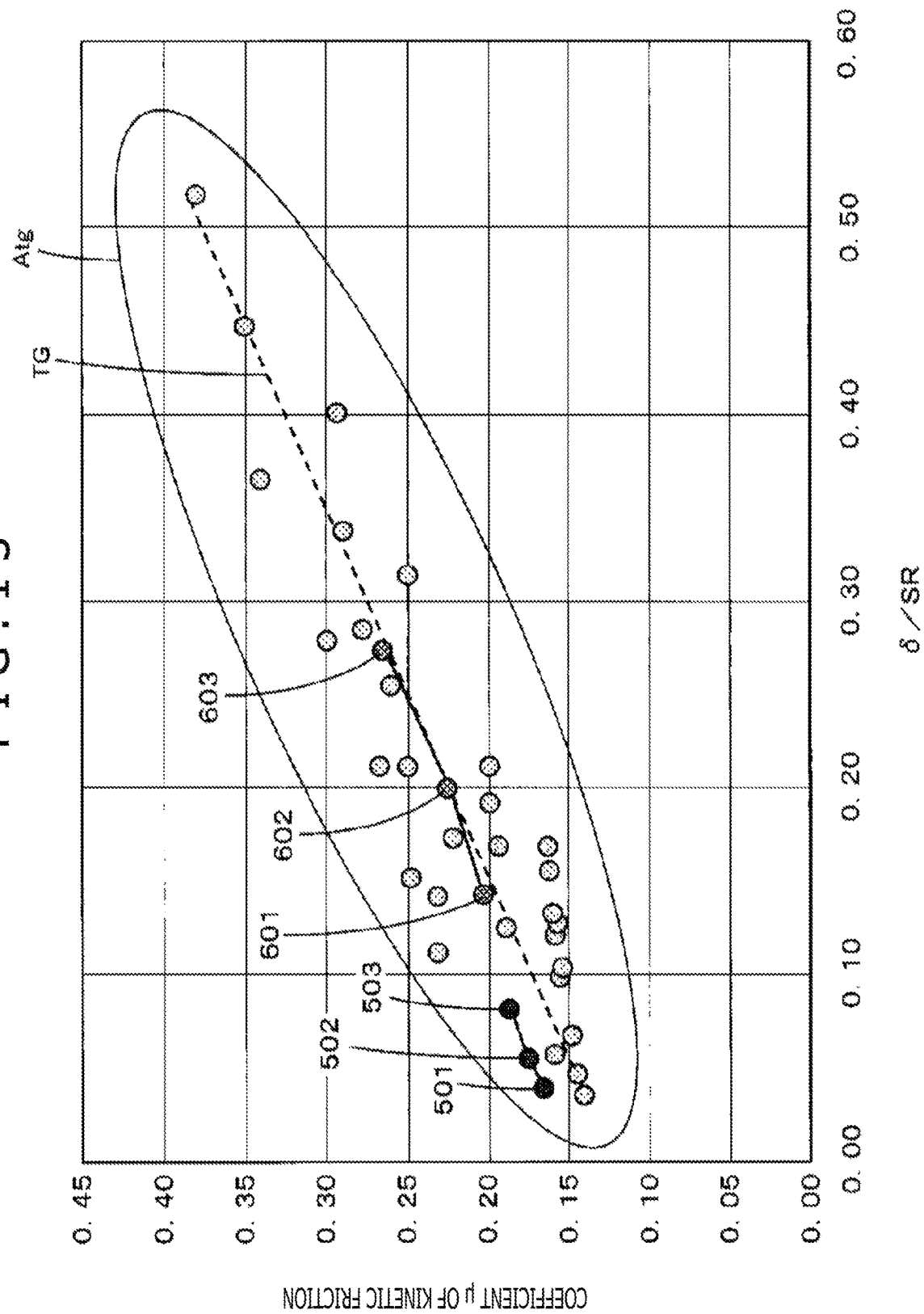

PEN INPUT DEVICE SHEET AND METHOD FOR MANUFACTURING PEN INPUT DEVICE SHEET

BACKGROUND

Technical Field

This disclosure relates to a pen input device sheet that is used for a pen input device composed of an electronic pen and a position detecting device that detects an indicated position indicated by this electronic pen and contacts the pen tip of the electronic pen. Furthermore, this disclosure relates to a method for manufacturing a pen input device sheet.

Background Art

Recently, pen input devices have come to be used as input devices of small-size pieces of electronic equipment, such as high-function mobile phone terminals called smartphones and pad-type terminals. Reduction in the thickness of electronic pens used for the pen input devices for such small-size pieces of electronic equipment is progressing and electronic pens whose pen tip has the same diameter as the pen tip of commercially-available ballpoint pens are also increasing.

Because of also such a background, the electronic pen has become required to enable input with a feeling of writing as if writing were performed on paper with a ballpoint pen, for example. For this purpose, as related arts, techniques of sticking a sheet devised to cause the above-described feeling of writing to appear (pen input device sheet) onto a pen indication input surface of a pen input device have been proposed.

For example, in Japanese Patent Laid-open No. 2014-137640 (Patent Document 1) and Japanese Patent Laid-open No. 2014-149817 (Patent Document 2), pen input device sheets (films) in which a recess-protrusion shape of a sheet surface is controlled to adjust the feeling of writing have been proposed. Furthermore, in Japanese Patent Laid-open No. 2006-119772 (Patent Document 3), a pen input device sheet (film) in which coating of a sheet surface with a soft resin is carried out to cause the feeling of writing to appear has been proposed.

However, in the method in which the feeling of writing is adjusted by controlling the recess-protrusion shape of the surface of the pen input device sheet, described in Patent Documents 1 and 2, there is a problem that it is impossible to reproduce a feeling (feeling of writing or writing pressure sense) based on denting of paper when writing is carried out on the paper with a pen. Furthermore, if the pen input device sheet exists over a display screen (pen indication input surface) of a display, there is a problem that, because of the recesses and protrusions of the surface of the transparent sheet, the display quality of the display screen of the display is impaired due to turbidity attributed to a rise in the haze value and rainbow glare attributed to the lens effect. If the recesses and protrusions of the surface of the pen input device sheet are made small in order to improve display quality, there is a problem that the sense of writing due to the effect of the recesses and protrusions is lowered.

The feeling of writing or the writing pressure sense refers to how the writing material is caught by the surface of paper when writing is carried out on the paper with the writing material. Particularly in the case of Chinese characters or the like, the number of strokes is large and variation on each stroke basis needs to be made clear. For this purpose, the clarity of the starting point of the stroke start and the ending point of the stroke end is necessary. In particular, as the types of stroke end, there are jump, stop, and sweep (in Japanese, "hane," "tome," and "harai," respectively). The feeling of writing greatly differs depending on how the writing material is caught by the surface of paper at the time of the stroke end.

Furthermore, in the method in which coating of the surface with a soft resin is carried out, described in Patent Document 3, the thickness of the soft resin layer is "preferably 5 to 200 µm and more preferably 5 to 100 µm and particularly preferably 10 to 50 µm," and the amount of sinking of the pen input device sheet (film) due to the writing pressure is also a small value smaller than the thickness of this soft resin layer. For this reason, there is a problem that the pen-catching suppression effect generated based on the amount of sinking of the pen input device sheet (film) due to the writing pressure is small and it is impossible to obtain a feeling of writing like that to pieces of paper overlapped in order to generate a sense of resistance by the friction force of the material.

In addition, in Patent Document 3, a method in which a coating that is impossible to apply again is carried out for the soft resin is also disclosed. However, this method involves the following problems. The expense for the firm coating corresponding to the soft resin is necessary and the cost becomes high. In addition, the coating has a drawback in the durability and the coating at the writing place peels away.

Moreover, regarding the pen input device sheet described in Patent Document 3, a method in which a soft resin layer is provided under a comparatively-hard film such as a polyethylene terephthalate (PET) film is also disclosed. However, in the case of this method, the stress acts on the soft resin layer in a distributed manner. Thus, a weak writing pressure yields the same sense of writing as a film without the soft resin layer. Even when the writing pressure is increased, sinking does not occur in a concentrated manner and displacement in which the whole gently bends occurs. Therefore, there is a possibility that a favorable sense of writing as in writing on paper is not obtained.

BRIEF SUMMARY

This disclosure intends to provide a pen input device sheet that allows the above-described problems to be solved.

In order to solve the above-described problems, an aspect of this disclosure provides a pen input device sheet that contacts a tip part of a core body of an electronic pen for a pen input device that detects a position indicated by the electronic pen. The pen input device sheet includes a resin film layer. SR is a diameter of the tip part of the core body of the electronic pen, δ is an amount of sinking of the resin film layer that changes according to a load applied by the tip part of the core body of the electronic pen when the tip part of the core body of the electronic pen is in contact with the pen input device sheet, and µ is a coefficient of kinetic friction between the resin film layer and the tip part of the core body that changes according to the load applied by the tip part of the core body of the electronic pen when the tip part of the core body of the electronic pen is in contact with the pen input device sheet with application of the load to the tip part. When the load applied to the tip part of the core body is changed and corresponding measurements of µ and δ are taken, and the measurements of µ and δ are plotted with µ allocated to an ordinate axis and a ratio of δ/SR is allocated to an abscissa axis, a fitted straight line plotted based on the measurements has a proportional relation corresponding to a proportional relation between μ and the ratio of δ/SR, which is represented by an expression indicated below regarding the resin film layer.

$$\mu \sim \delta/SR \text{ (symbol "}\sim\text{" means "proportional to")} \quad \text{(expression 1)}$$

The proportional relation of the above-described (expression 1) is satisfied when drawing is carried out on paper with a writing implement, e.g. a ballpoint pen. Thus, according to the pen input device sheet in accordance with the aspect of this disclosure with the above-described configuration, when the electronic pen is brought into contact with the sheet and indication input is carried out, a feeling of writing similar to that when drawing is carried out on paper with a writing implement, e.g. a ballpoint pen, can be obtained.

According to the pen input device sheet in accordance with this disclosure, when the electronic pen is brought into contact with the sheet and indication input is carried out, a feeling of writing similar to that when drawing is carried out on paper with a writing implement, e.g. a ballpoint pen, can be obtained.

Furthermore, in the pen input device sheet according to this disclosure, recesses and protrusions do not need to be provided on the sheet surface. Therefore, although this pen input device sheet is stuck onto the display screen of a display, the deterioration of the display quality of the screen can be prevented. Moreover, the feeling of writing is not caused to appear by only a thin coating layer of a soft resin formed on the surface and this disclosure has a configuration to cause the feeling of writing to appear by including the resin film layer having the characteristic of (expression 1). Thus, the following effects are provided. The thickness can be easily set to a predetermined value or larger and the effect of pen catching generated based on the amount of sinking of the pen input device sheet due to the writing pressure is sufficiently obtained. Furthermore, it is also possible to obtain a feeling of writing on, for example, pieces of paper overlapped in order to generate a sense of resistance by not the core body but the friction force and deformation of the material forming the film.

BRIEF DESCRIPTION OF THE DRAWINGS

FIG. 7 is a diagram used for explaining part of a pen input device sheet according to an embodiment of this disclosure;

FIG. 10 is a diagram used for explaining part of a pen input device sheet according to an embodiment of this disclosure;

FIG. 13 is a diagram for explaining a characteristic of one example of the embodiment of the pen input device sheet according to this disclosure.

DETAILED DESCRIPTION OF THE PREFERRED EMBODIMENTS

[Configuration Example of Pen Input Device]

Prior to description of an embodiment of the pen input device sheet according to this disclosure and an embodiment of a manufacturing method thereof, a configuration example of a pen input device to which this disclosure is applied will be described.

Figure 1:
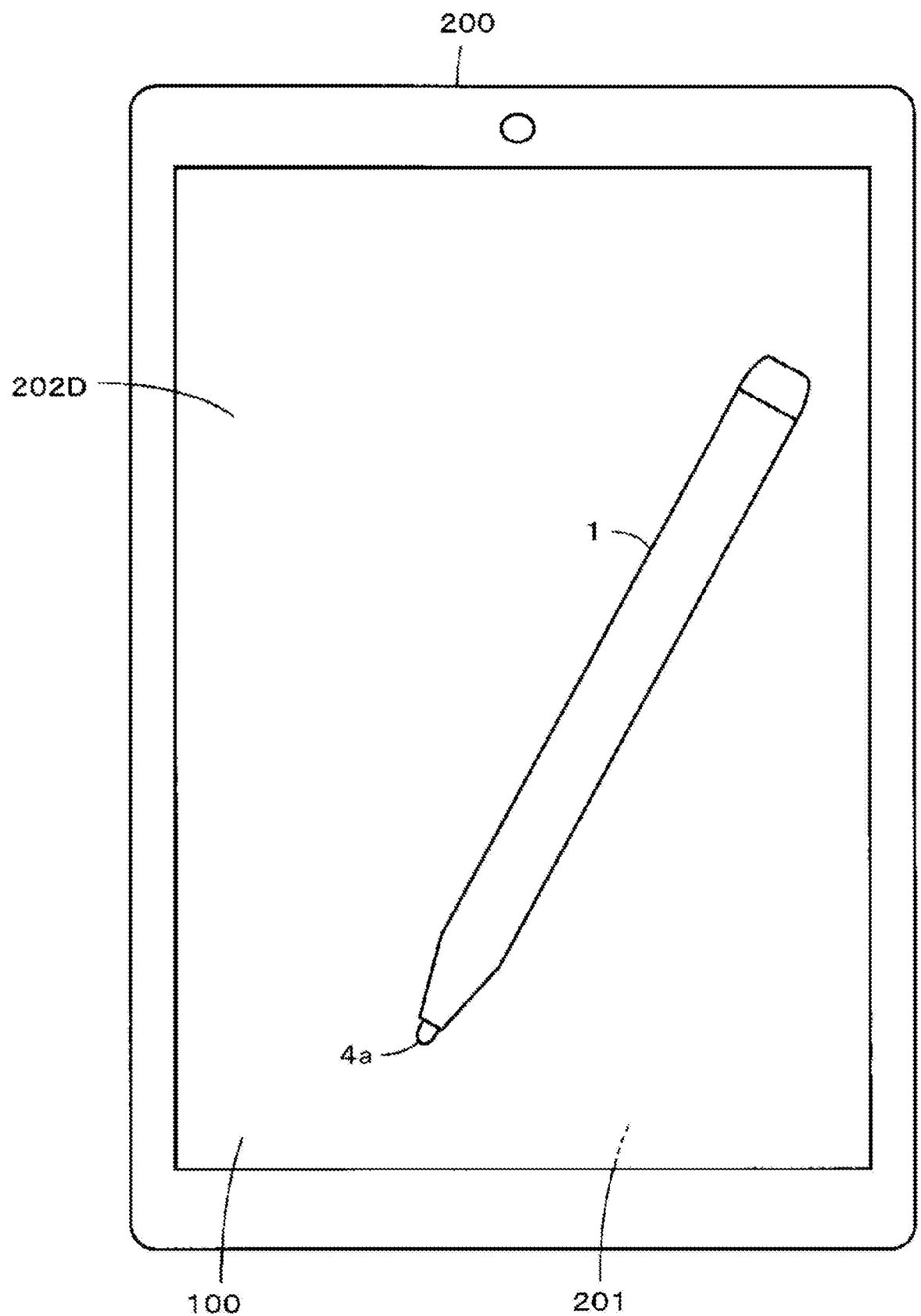
FIG. 1 is a diagram depicting an example of a pen input device for which a pen input device sheet according to this disclosure is used.

FIG. 1 depicts one example of a tablet-type information terminal 200 as an example of the pen input device of this embodiment. In this example, the tablet-type information terminal 200 includes a display device, a liquid crystal display (LCD) in this example, and includes a position detecting device 201 of an electromagnetic induction system under (on the back surface side) of a display screen 202D of this display device. Furthermore, the tablet-type information terminal 200 includes an electronic pen 1 that carries out position indication to a position detecting sensor of this position detecting device 201 based on the electromagnetic induction system. In addition, in this embodiment, a pen input device sheet 100 of the embodiment of this disclosure is provided to be stuck onto the display screen 202D of the tablet-type information terminal 200.

A user carries out an input operation such as drawing a line on the pen input device sheet 100 in the state in which a tip part (pen tip) 4a of a core body of the electronic pen 1 is brought into contact with the pen input device sheet 100 and a predetermined writing pressure is applied to the pen tip 4a. The position detecting device 201 detects the drawing input on the pen input device sheet 100 with the electronic pen 1 and detects the writing pressure of the electronic pen 1 at the time of this drawing input.

[Description of Mechanical Configuration Example of Electronic Pen]

Figure 2:
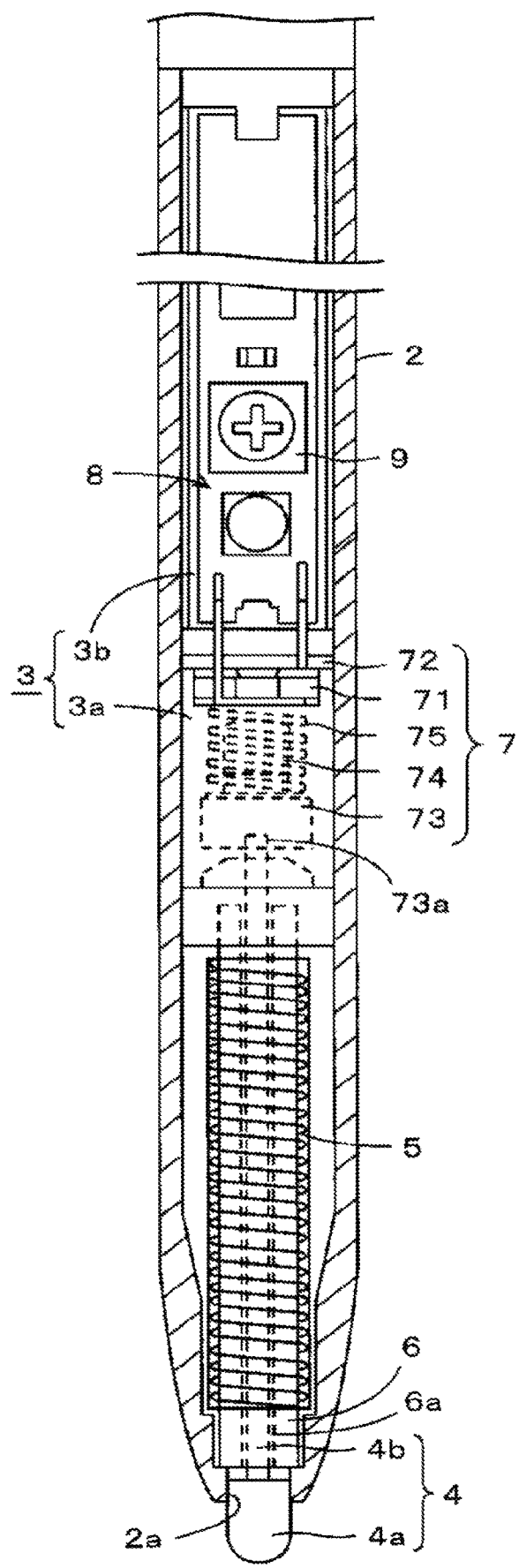
FIG. 2 is a diagram for explaining a configuration example of an electronic pen that configures the pen input device of the example of FIG. 1.

FIG. 2 depicts the outline of the electronic pen 1 of this embodiment. The electronic pen 1 of this example includes a case 2 (casing) that is elongated in an axial center direction of the electronic pen 1 and forms a bottomed, circular cylindrical casing in which an opening 2a is made on one side in the axial center direction and the other side in the axial center direction is closed. FIG. 2 is a diagram depicting the inside of the case 2 of the electronic pen 1 through breaking only the case 2 for explanation.

In the hollow part of the case 2, a core body 4 and a magnetic core, a ferrite core 6 in this example, around which a coil 5 is wound are joined to a board holder 3 and are housed. The tip part 4a of the core body 4 is configured to protrude to outside of the case 2 through the opening 2a of the case 2 and be exposed.

The ferrite core 6 has a through-hole 6a with a predetermined diameter at the center axis position and a core body main part 4b of the core body 4 is inserted in this through-hole 6a and is joined to a writing pressure detecting module 7 provided on the board holder 3. In this case, the core body 4 is in a state of being movable in the axial center direction via the through-hole 6a of the ferrite core 6. The core body 4 is joined to the writing pressure detecting module 7 and is made insertable and removable.

The board holder 3 is formed by a resin, for example, in such a manner that a writing pressure detecting module holder part 3a (hereinafter, referred to simply as the holder part 3a) and a printed circuit board placement base part 3b are continuous in the longitudinal direction that is the axial center direction of the electronic pen 1. Plural components that form the writing pressure detecting module 7 are housed in the holder part 3a and a printed circuit board 8 is placed and held on the printed circuit board placement base part 3b. The holder part 3a is formed closest to the core body 4 in the board holder 3 and the core body 4 and the ferrite core 6 are joined to this holder part 3a.

A capacitor 9 that forms a resonant circuit with the coil 5 and other electronic components are provided on the printed circuit board 8. In the printed circuit board 8, both ends of the coil 5 are connected to both ends of the capacitor 9. In addition, a variable-capacitance capacitor formed of the writing pressure detecting module 7 to be described later is connected in parallel to the coil 5 and the capacitor 9.

Next, components that form the writing pressure detecting module 7 will be described below. The writing pressure detecting module 7 of this example corresponds to the case in which a variable-capacitance capacitor whose capacitance changes according to the writing pressure applied to the core body 4 is used. The holder part 3a of the board holder 3 is formed of a tubular body having a hollow part and is provided with a configuration in which the components forming the writing pressure detecting module 7 are lined up in the axial center direction and are housed in the hollow part.

The components forming the writing pressure detecting module 7 of this example are plural components, a dielectric body 71, a terminal member 72, a holding member 73, an electrically-conductive member 74, and an elastic member 75. The terminal member 72 forms a first electrode of the variable-capacitance capacitor formed as the writing pressure detecting module 7 and is electrically connected to an electrically-conductive pattern of the printed circuit board 8. Furthermore, the electrically-conductive member 74 and the elastic member 75 are electrically connected to form a second electrode of the above-described variable-capacitance capacitor and are electrically connected to the electrically-conductive pattern of the printed circuit board 8. The terminal member 72 is disposed opposed to the electrically-conductive member 74 and the elastic member 75 in the axial center direction with the intermediary of the dielectric body 71.

The terminal member 72 and the dielectric body 71 are disposed to be immovable in the axial center direction in the holder part 3a. Furthermore, what is obtained by joining the electrically-conductive member 74 to the holding member 73 with the intermediary of the elastic member 75 in the axial center direction is inserted into the holder part 3a. The holding member 73 is locked in the holder part 3a. However, the holding member 73 is configured to be movable in the axial center direction in the state of being housed in the hollow part of the holder part 3a. Furthermore, the holding member 73 has a recess 73a to which the core body main part 4b of the core body 4 is press-fitted on the side of the core body 4 in the axial center direction.

The electrically-conductive member 74 is formed of an elastic member that has electrical conductivity and is elastically deformable, and is composed of silicone electrically-conductive rubber or pressurized electrically-conductive rubber, for example. Furthermore, the elastic member 75 is formed of a coil spring having electrical conductivity, for example. In the holding member 73, the electrically-conductive member 74 and the elastic member 75 get contact with each other to be set to the state of being electrically connected.

In the above configuration, when a pressure (writing pressure=load) is applied to the tip part 4a of the core body 4, the electrically-conductive member 74 is displaced toward the dielectric body 71 in the axial center direction against the elastic force of the elastic member 75 through the holding member 73 and the contact area between the electrically-conductive member 74 and the dielectric body 71 changes according to the writing pressure, so that the change becomes change in the capacitance. Due to this change in the capacitance formed by the writing pressure detecting module 7, the resonant frequency of the resonant circuit changes and the change in this resonant frequency is transmitted to the position detecting device 201. In the position detecting device 201, by detecting the change in this resonant frequency, the capacitance of the variable-capacitance capacitor formed of the writing pressure detecting module 7 of the electronic pen 1 can be detected and the writing pressure (=load) applied to the electronic pen 1 can be detected from this detected capacitance.

[Circuit Configuration for Position Detection and Writing Pressure Detection in Position Detecting Device Used with Electronic Pen]

Next, description will be made with reference to FIG. 3 about a circuit configuration example of the position detecting device 201 that carries out detection of a position indicated by the above-described electronic pen 1 and detection of the writing pressure (=load) applied to the electronic pen 1 and the operation thereof.

Figure 3:
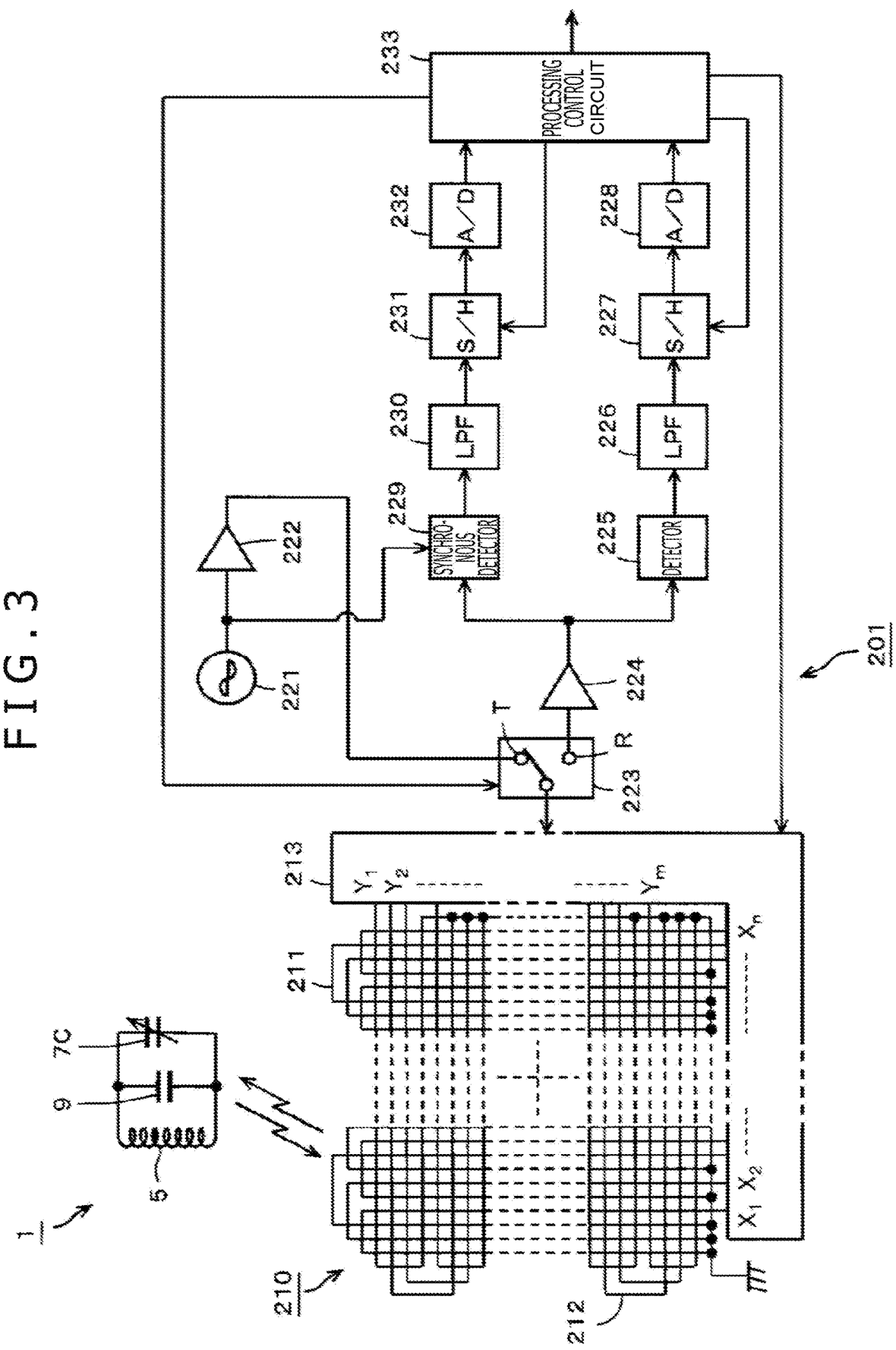
FIG. 3 is a diagram for explaining a configuration example of a position detecting device that configures the pen input device of the example of FIG. 1.

As depicted in FIG. 3, the electronic pen 1 includes a resonant circuit in which the coil 5, a variable-capacitance capacitor 7C formed of the writing pressure detecting module 7, and the capacitor 9 disposed on the printed circuit board 8 are connected in parallel.

Meanwhile, in the position detecting device 201, an X-axis direction loop coil group 211 and a Y-axis direction loop coil group 212 are stacked and a position detecting coil 210 is formed. The loop coil groups 211 and 212 are composed of n and m, respectively, rectangular loop coils, for example. The loop coils configuring the respective loop coil groups 211 and 212 are disposed to be lined up at equal intervals and sequentially overlap with each other.

Furthermore, in the position detecting device 201, a selection circuit 213 to which the X-axis direction loop coil group 211 and the Y-axis direction loop coil group 212 are connected is provided. This selection circuit 213 sequentially selects one loop coil in the two loop coil groups 211 and 212.

Moreover, the position detecting device 201 is provided with an oscillator 221, a current driver 222, a switching connecting circuit 223, a receiving amplifier 224, a detector 225, a low-pass filter 226, a sample/hold circuit 227, an analog to digital (A/D) conversion circuit 228, a synchronous detector 229, a low-pass filter 230, a sample/hold circuit 231, an A/D conversion circuit 232, and a processing control circuit 233. The processing control circuit 233 is formed of a microcomputer.

The oscillator 221 generates an alternating-current (AC) signal with a frequency f0. Furthermore, the oscillator 221 supplies the generated AC signal to the current driver 222 and the synchronous detector 229. The current driver 222 converts the AC signal supplied from the oscillator 221 to a current and sends out the current to the switching connecting circuit 223. Based on control from the processing control circuit 233, the switching connecting circuit 223 switches the connection target (transmitting-side terminal T, receiving-side terminal R) to which the loop coil selected by the selection circuit 213 is connected. In these connection targets, the transmitting-side terminal T and the receiving-side terminal R are connected to the current driver 222 and the receiving amplifier 224, respectively.

An induced voltage generated in the loop coil selected by the selection circuit 213 is sent to the receiving amplifier 224 via the selection circuit 213 and the switching connecting circuit 223. The receiving amplifier 224 amplifies the induced voltage supplied from the loop coil and sends out the amplified voltage to the detector 225 and the synchronous detector 229.

The detector 225 detects the induced voltage generated in the loop coil, i.e. the received signal, and sends out the received signal to the low-pass filter 226. The low-pass filter 226 has a cutoff frequency sufficiently lower than the above-described frequency f0 and converts the output signal of the detector 225 to a direct-current (DC) signal to send out the DC signal to the sample/hold circuit 227. The sample/hold circuit 227 holds a voltage value at predetermined timing of the output signal of the low-pass filter 226, specifically at predetermined timing in the reception period, and sends out the voltage value to the A/D conversion circuit 228. The A/D conversion circuit 228 converts the analog output of the sample/hold circuit 227 to a digital signal and outputs the digital signal to the processing control circuit 233.

Meanwhile, the synchronous detector 229 carries out synchronous detection of the output signal of the receiving amplifier 224 with the AC signal from the oscillator 221 and sends out a signal at a level according to the phase difference between them to the low-pass filter 230. This low-pass filter 230 has a cutoff frequency sufficiently lower than the frequency f0 and converts the output signal of the synchronous detector 229 to a DC signal to send out the DC signal to the sample/hold circuit 231. This sample/hold circuit 231 holds a voltage value at predetermined timing of the output signal of the low-pass filter 230 and sends out the voltage value to the A/D conversion circuit 232. The A/D conversion circuit 232 converts the analog output of the sample/hold circuit 231 to a digital signal and outputs the digital signal to the processing control circuit 233.

The processing control circuit 233 controls the respective components of the position detecting device 201. Specifically, the processing control circuit 233 controls selection of the loop coil in the selection circuit 213, switching by the switching connecting circuit 223, and the timing of the sample/hold circuits 227 and 231. The processing control circuit 233 causes radio waves to be transmitted from the X-axis direction loop coil group 211 and the Y-axis direction loop coil group 212 with a certain transmission continuation time (continuous transmission section) based on input signals from the A/D conversion circuits 228 and 232.

In each loop coil of the X-axis direction loop coil group 211 and the Y-axis direction loop coil group 212, an induced voltage is generated by radio waves transmitted (returned) from the electronic pen 1. The processing control circuit 233 calculates the coordinate value of the position indicated by the electronic pen 1 in the X-axis direction and the Y-axis direction based on the level of the voltage value of this induced voltage generated in each loop coil. Furthermore, the processing control circuit 233 detects the writing pressure based on the level of a signal according to the phase difference between transmitted radio waves and received radio waves.

Figure 4:
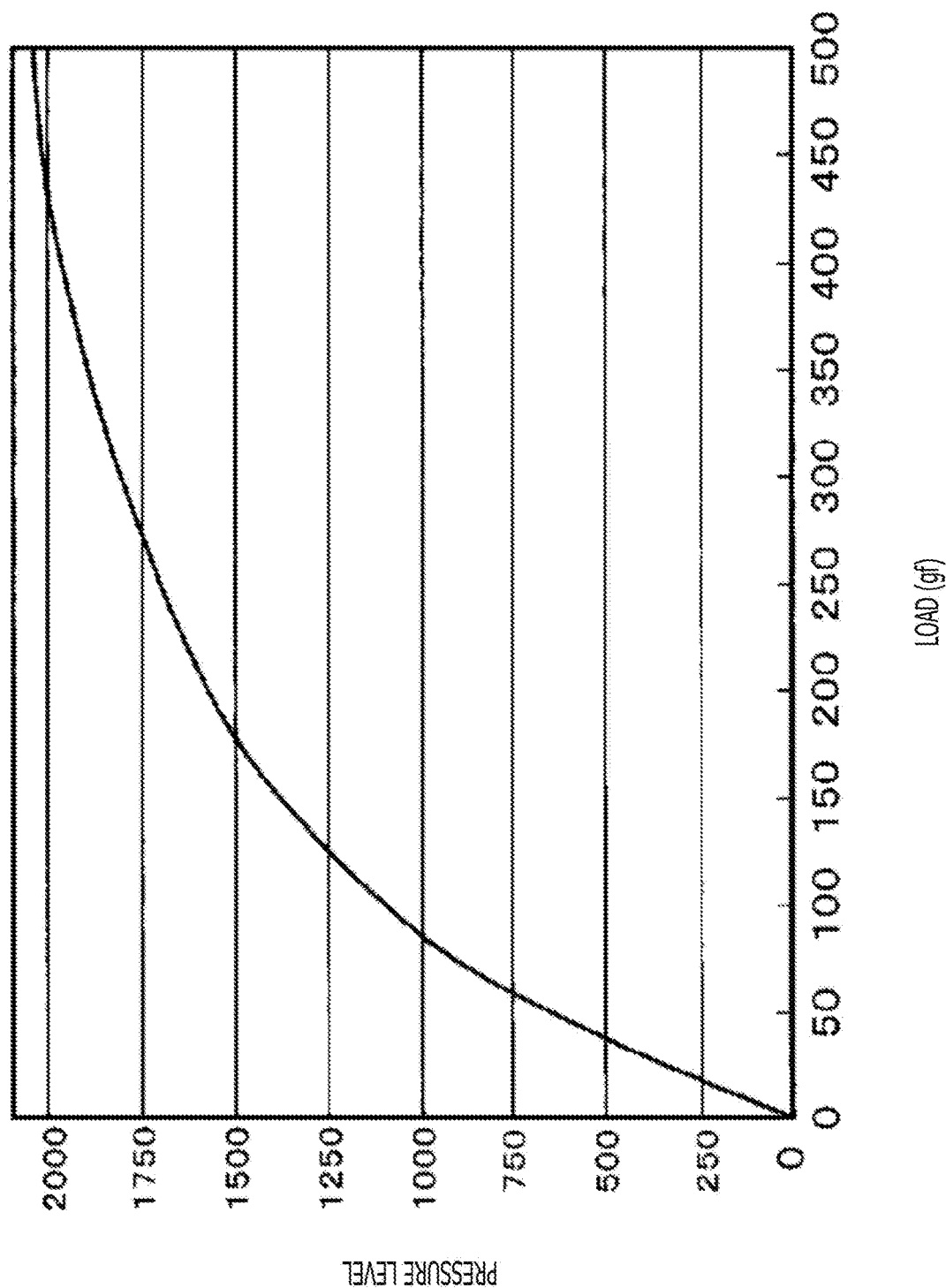
FIG. 4 is a diagram depicting an example of a writing pressure detection characteristic in the pen input device of the example of FIG. 1.

In this manner, the position of the electronic pen 1 that approaches is detected by the processing control circuit 233 in the position detecting device 201. Furthermore, information on the writing pressure value of the electronic pen 1 is obtained by detecting the phase of a received signal. In FIG. 4, one example of the writing pressure detection characteristic in the position detecting device 201 is depicted. As is understood from the above, the load (writing pressure) applied to the electronic pen 1 to be described later can be detected in this position detecting device 201.

[Configuration of Pen Input Device Sheet]

Figure 5:
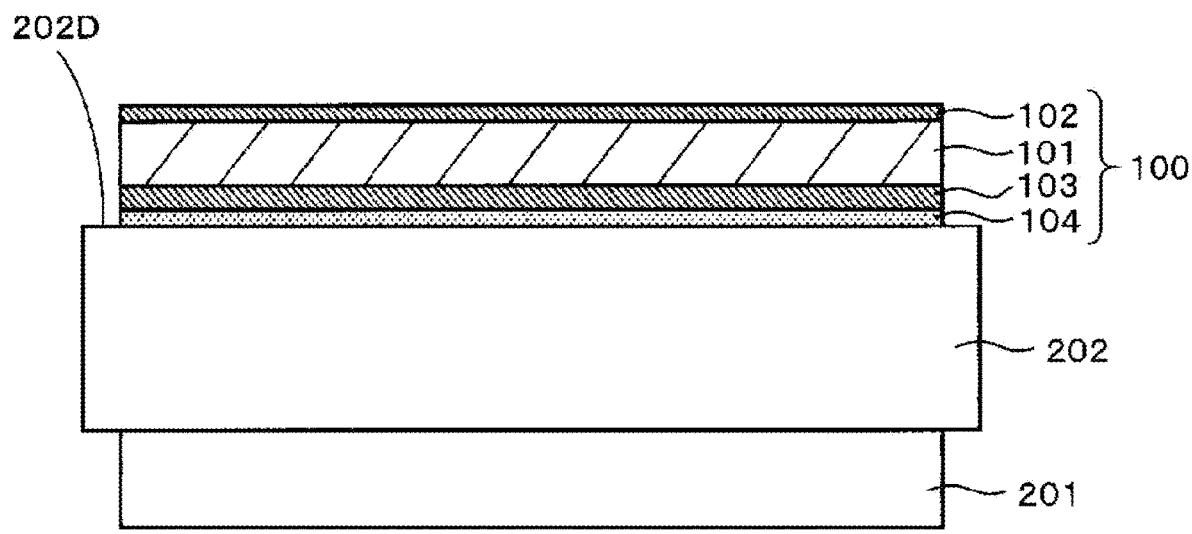
FIG. 5 is a diagram for explaining a configuration example of a pen input device sheet according to an embodiment of this disclosure.

FIG. 5 is a diagram for explaining a configuration example of the pen input device sheet 100 of this embodiment and the pen input device sheet 100 is depicted by a sectional view. However, because this FIG. 5 is a diagram for explanation, an LCD 202 and the position detecting device 201 are not represented as the sectional view. As described above, the pen input device sheet 100 of this embodiment is provided on the display screen 202D of the LCD 202 as an example of the display device.

The pen input device sheet 100 includes a resin film layer 101. As this resin film layer 101, a self-restoring soft resin film layer is used in this embodiment. In this embodiment, as described later, the material of this resin film layer 101 and the thickness and hardness thereof are selected and adjusted to cause the user of the electronic pen 1 to obtain a predetermined feeling of writing when indication input is carried out by bringing the electronic pen 1 into contact with this pen input device sheet 100 and moving the electronic pen 1. In the embodiment described below, as one example, the adjustment is carried out to cause the pen input device sheet 100 to have a feeling of writing when writing is carried out on paper as an example of a writing medium with a writing material, a ballpoint pen in this example.

On the side of contact with the electronic pen 1, of this resin film layer 101, a coating layer 102 formed through application of a surface coating agent may be provided. This coating layer 102 is formed of, e.g., oil, wax, or silicone containing sebum or a coating agent that contains sebum and can be applied again. This coating layer 102 also contributes to the predetermined feeling of writing realized by the user of the electronic pen 1.

This coating layer 102 may be applied in manufacturing as the pen input device sheet 100 or may be applied by the user. Furthermore, the methods of the application include also the case in which the coating layer 102 is naturally applied on the resin film layer 101 of this pen input device sheet 100 in association with execution of input work on the pen input device sheet 100 by the user with the electronic pen 1.

In this embodiment, a transparent substrate layer 103 is provided on the resin film layer 101 on a side of the resin film layer 101 that is opposite to a side of the resin film layer 101 that is adjacent to the coating layer 102. The existence of the transparent substrate layer 103 facilitates handling and manufacturing of the pen input device sheet 100 of this embodiment. An adhesive layer 104 for an optical film that has high transparency and is formed by using an acrylic adhesive agent, for example, is applied on this transparent substrate layer 103, and the pen input device sheet 100 is stuck onto the display screen 202D of the LCD 202 by this adhesive layer 104.

It is also possible to configure this adhesive layer 104 by applying an adhesive agent and it is also possible to configure the adhesive layer 104 by sticking an adhesive agent film onto the transparent substrate layer 103. Furthermore, it is also possible to configure the adhesive layer 104 by an adhesive agent film that can be peeled again. Moreover, it is also possible to configure the adhesive layer 104 by using a transparent film with an adhesive material. In this case, the pen input device sheet 100 stuck to the display screen 202D of the display device 202 can be replaced by the pen input device sheet 100 with a feeling of writing according to the preference by the user.

[Characteristics of Feeling of Writing When Drawing is Carried Out on Paper with Ballpoint Pen]

The pen input device sheet 100 of this embodiment has been created based on the result of a research by the inventors on quantification of the feeling of writing when drawing is carried out on paper with a ballpoint pen.

The inventors considered various factors (factors about the pen and factors about the paper (sheet)) that would have a relation to the feeling of writing and made a research about the correlation between these various factors and the feeling of writing when writing is carried out on paper with a ballpoint pen.

Figure 6A:
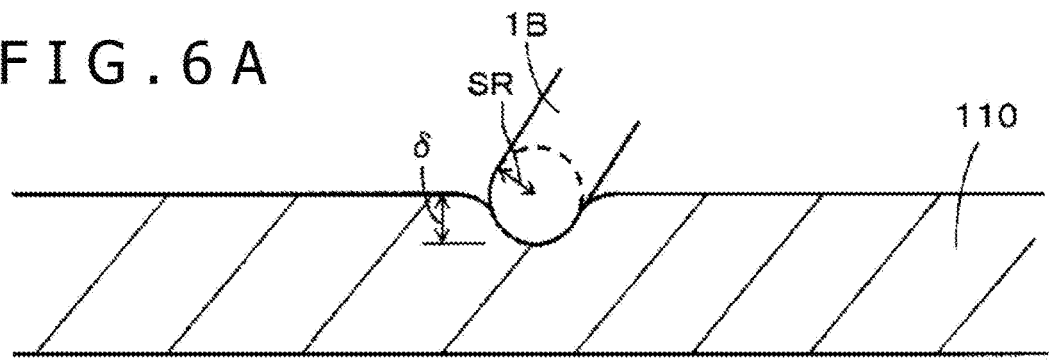
FIGS. 6A and 6B are diagrams used for explaining part of a pen input device sheet according to an embodiment of this disclosure.

In this research, as the factors having a relation to the feeling of writing, the inventors paid attention to a radius SR of the pen tip of a ballpoint pen 1B, an amount δ of sinking of copy paper 110 when a load (writing pressure) was applied to the ballpoint pen 1B, and a coefficient μ of kinetic friction when writing was carried out on the paper 110 with the ballpoint pen 1B as depicted in FIG. 6A. Furthermore, the inventors investigated the relation between the ratio δ/SR between the amount δ of sinking and the radius SR of the pen tip of the ballpoint pen 1B and the coefficient μ of kinetic friction. As a result, the inventors discovered that there was a noteworthy correlation described below. This disclosure is based on this discovery. In this example, copy paper with 67 g/m² and a thickness of 0.09 mm was used as the paper 110.

FIG. 7 depicts a result of measurement and obtainment of change in the ratio δ/SR between the amount δ of sinking of the paper 110 and the radius SR of the tip of the ballpoint pen 1B when the load (writing pressure) applied to the ballpoint pen 1B was changed and change in the corresponding coefficient μ of kinetic friction.

In this example of FIG. 7, two kinds of ballpoint pen 1B, ballpoint pens 1B having 0.5 mm (SR=0.25) and 1.00 mm (SR=0.5) as the diameter of the pen tip of the ballpoint pen 1B, were prepared. Furthermore, three kinds of loads, 50 gf, 100 gf, and 200 gf, were applied to the ballpoint pen 1B. Moreover, the number of pieces of paper when pieces of paper were overlapped was employed as a substitute for the thickness of the paper 110. In the example of FIG. 7, about the thickness of each of one piece of paper to five pieces of paper, the ratio δ/SR between the amount δ of sinking of the paper 110 and the radius SR of the tip of the ballpoint pen 1B and the coefficient μ of kinetic friction when the respective loads were applied were measured.

Figure 8:
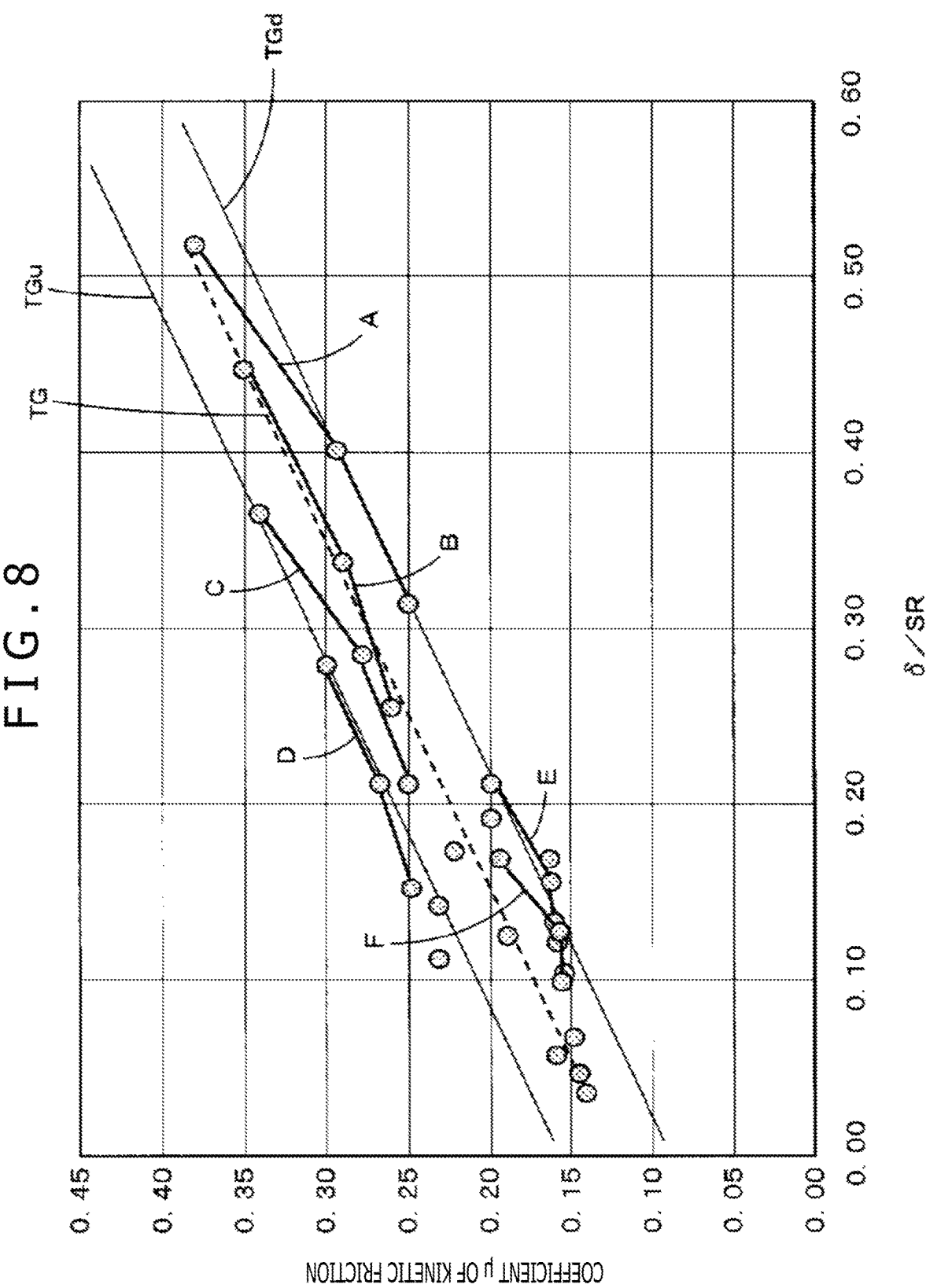
FIG. 8 is a diagram used for explaining part of a pen input device sheet according to an embodiment of this disclosure.

When the result of FIG. 7 obtained in this manner is converted to a graph in such a manner that the value of the coefficient μ of kinetic friction is allocated to the ordinate axis and the ratio δ/SR between the amount δ of sinking of the paper 110 and the radius SR of the tip of the ballpoint pen 1B is allocated to the abscissa axis, a graph depicted in FIG. 8 is obtained. In FIG. 8, change in the coefficient μ of kinetic friction with respect to change in the load is depicted. As main results, the changes in the case of fields represented by reference symbols A to F in FIG. 7 are linked by corresponding straight lines A to F and are depicted in FIG. 8. Specifically, straight line A indicates the case of SR=0.25 and five pieces of copy paper. Straight line B indicates the case of SR=0.25 and four pieces of copy paper. Straight line C indicates the case of SR=0.25 and three pieces of copy paper. Straight line D indicates the case of SR=0.25 and two pieces of copy paper. Straight line E indicates the case of SR=0.5 and five pieces of copy paper. Straight line F indicates the case of SR=0.5 and three pieces of copy paper.

As is apparent from this FIG. 8, it has turned out that a proportional relation represented by (expression A) exists between the coefficient μ of kinetic friction and the ratio δ/SR according to a fitted or approximate straight line of the data plotted through measurement with respect to the change in the load applied to the pen tip of the ballpoint pen 1B.

$$\mu \sim \delta/SR \text{ (symbol "~" means "proportional to")} \quad \text{(expression A) (same as (expression 1))}$$

This (expression A) represents a fitted or an approximate straight line of data plotted through measurement under plural conditions and does not indicate that the measurement points are surely linked in a straight line manner. If SR and the thickness of paper are fixed, the amount δ of sinking increases according to the load applied to the pen tip of the ballpoint pen 1B. Therefore, this proportional relation indicates that the coefficient μ of kinetic friction becomes larger when the load is made higher.

That is, it has turned out that a strong correlation exists between the coefficient μ of kinetic friction that will greatly contribute to the feeling of writing on the paper 110 with the ballpoint pen 1B and the ratio δ/SR between the amount δ of sinking of the paper 110 and the radius SR of the tip of the ballpoint pen 1B and the correlation is a proportional relation like one depicted by a dotted straight line TG drawn based on the approximate straight line of the data plotted in FIG. 8.

Figure 6B:
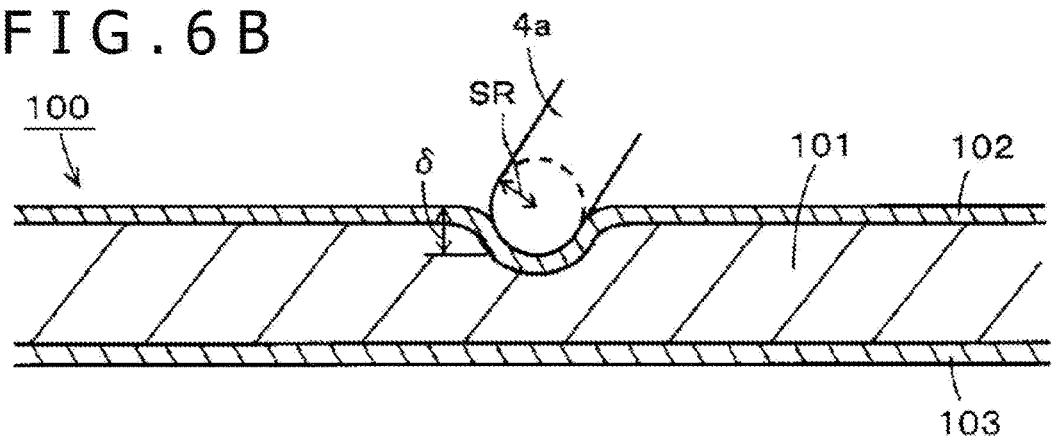

Therefore, when this research result is deemed as the premise, a sheet having a characteristic of the proportional relation represented by (expression A) like that depicted by the dotted straight line TG in FIG. 8 provides a feeling of writing similar to that when drawing is carried out on the paper 110 with the ballpoint pen 1B. Specifically, as depicted in FIG. 6B, when the radius of the pen tip 4a as the tip part of the core body 4 of the electronic pen 1 is defined as SR and the amount of sinking in the pen input device sheet 100 of the embodiment is defined as δ, the pen input device sheet 100 of the embodiment provides a feeling of writing similar to that when drawing is carried out on the paper 110 with the ballpoint pen 1B if this pen input device sheet 100 is configured in such a manner that the approximate straight line satisfies (expression A).

[Pen Input Device Sheet]

In light of the above, in the pen input device sheet 100 of this embodiment, first the resin film layer 101 is adjusted to satisfy (expression A) with the above-described contents. That is, in this embodiment, for the resin film layer 101, the component of the material is adjusted to satisfy (expression A) with the above-described contents. As this resin film layer 101, urethane resin (polyurethane), fluorine rubber, or the like can be used, for example. In this embodiment, a urethane resin that is a self-restoring soft resin is used as the resin film layer 101.

In this case, the adjustment can be carried out to satisfy (expression A) with the above-described contents based on the component ratio of the material forming the polyurethane resin layer that configures the resin film layer 101 in this embodiment, mixing of a predetermined mixture, and so forth. As an example of the adjustment, it is conceivable that the strength of binding between molecules of the resin film is changed. Even with the same amount of sinking, if the binding between molecules of the resin film is strong, the resin film sinks in a wide range, with molecules around the pen tip as the center being pulled. If the binding between molecules is weak, the resin film sinks only at the periphery of the pen tip. Therefore, the coefficient μ of kinetic friction can be changed through change in the mode of the resin film by which the pen tip is caught at the time of writing. However, the gist of this disclosure is not how to concretely configure the material of the urethane resin layer forming the resin film layer 101. Thus, description is omitted here about concrete examples of the component constitution thereof.

By thus adjusting the material of the resin film layer 101, the pen input device sheet 100 having a slope characteristic similar to the tendency represented in (expression A) can be configured. Here, the coating layer 102 may be absent if a characteristic that corresponds with or is close to the straight line TG depicted in FIG. 8 is obtained through only the adjustment of this resin film layer 101. Here, the "characteristic close to the straight line TG" refers to a straight line that is as parallel to the straight line TG as possible and exists in the region sandwiched by a straight line TGu that is parallel to the straight line TG and is at the upper limit of permission in the direction in which the coefficient μ of kinetic friction becomes larger and a straight line TGd that is parallel to the straight line TG and is at the lower limit of permission in the direction in which the coefficient μ of kinetic friction becomes smaller.

However, there is also the case in which the characteristic that corresponds with or is close to the straight line TG depicted in FIG. 8 is not obtained. In this case, as described in detail later with use of FIG. 9, the coating layer 102 is provided and the material and thickness of this coating layer 102 are adjusted. The slope of the straight line of the above-described proportional characteristic is settled based on the resin film layer 101. By the coating layer 102, adjustment can be carried out to cause the straight line of the proportional characteristic of this resin film layer 101 to fall within the region sandwiched by the straight line TGu of the upper limit and the straight line TGd of the lower limit in FIG. 8.

Furthermore, the thickness and hardness of the resin film layer 101 are selected or adjusted in consideration of the durability of the pen input device sheet 100 against writing (indication input) with the electronic pen 1 and prevention of the lowering of the sense of writing with the electronic pen 1 on the pen input device sheet 100 at the time of writing pressure application.

Specifically, if the amount δ of sinking (see FIG. 6) of the pen tip at the time of writing on the pen input device sheet 100 with the electronic pen 1 (hereinafter, referred to as pen writing) becomes too large, the durability of the pen input device sheet 100 against the pen writing is lowered. Therefore, regarding the hardness of the resin film layer 101, a lower-limit value with which the amount δ of sinking of the pen tip of the electronic pen 1 does not become too large is selected.

Here, as a range for reproducing the feeling of writing between paper and a ballpoint pen, an ellipse Atg can be defined as a target range depicted in FIG. 9 to be described later.

A factor that greatly contributes to the feeling of writing will be the coefficient μ of kinetic friction. Therefore, it is important to define the range of the coefficient μ of kinetic friction to define the feeling of writing. In FIG. 7 and FIG. 8, straight line A indicates the case of the thickness of five pieces of copy paper. As a general use form for deriving a favorable feeling of writing on a smooth plate, the case in which two or three pieces of paper are placed and writing is carried out is envisaged. Then, straight line C, straight line D, and straight line F will be practical. At this time, the coefficient μ of kinetic friction is in a range of 0.10 to 0.40 ($0.1 \leq \mu \leq 0.4$). The range of the ratio δ/SR derived from the range of this coefficient μ of kinetic friction is 0.01 to 0.5 ($0.01 \leq \delta/SR \leq 0.5$). This will be the range for reproducing the feeling of writing between paper and a ballpoint pen and this range can be envisaged as the target range ellipse Atg.

Figure 9:
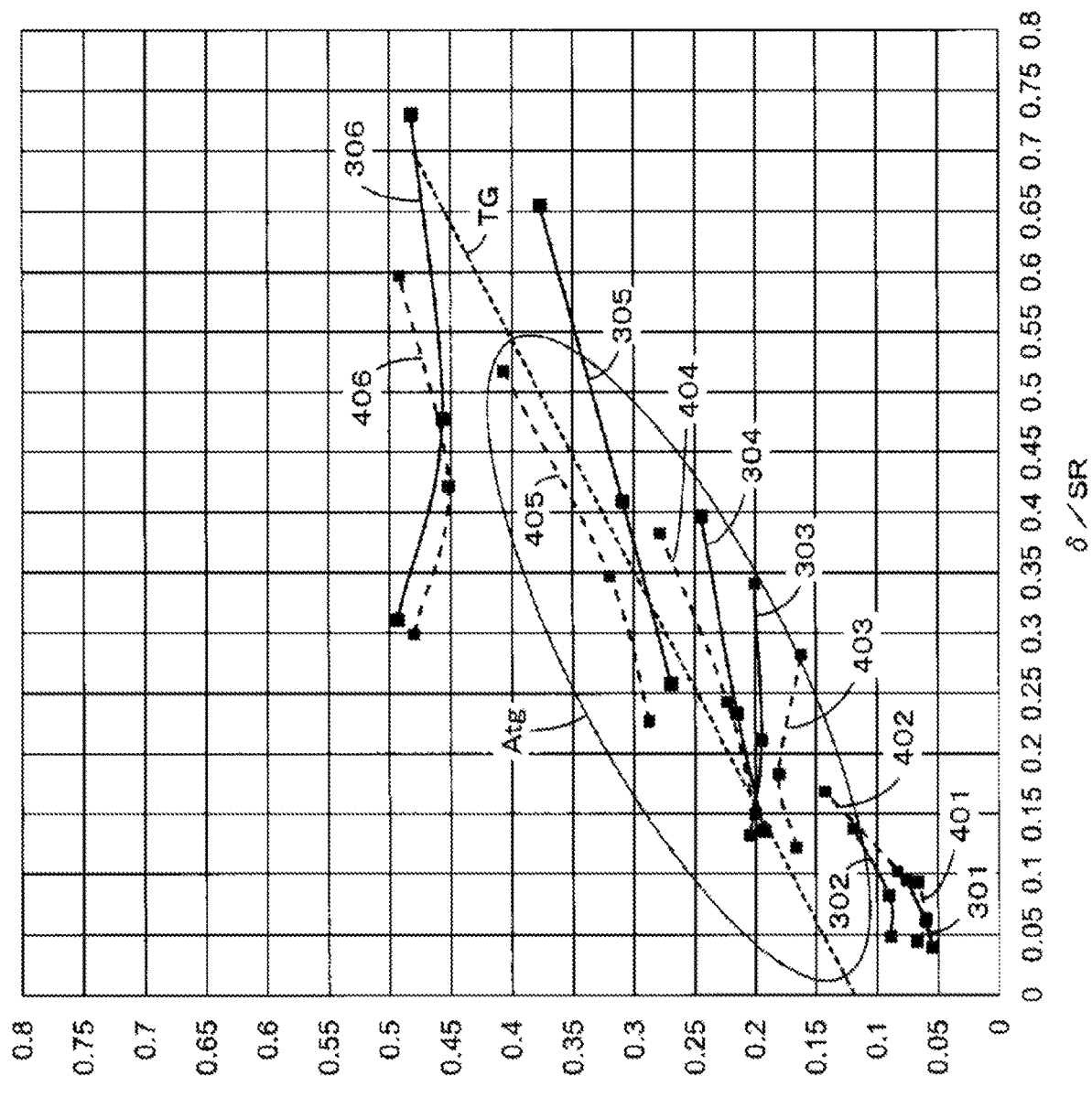
FIG. 9 is a diagram used for explaining part of a pen input device sheet according to an embodiment of this disclosure.

FIG. 9 depicts an example of actual measurement values of the relation between the coefficient μ of kinetic friction and the ratio δ/SR when the applied load (writing pressure) was changed regarding each of the cases in which the material, thickness, and hardness of the resin film layer 101 were changed. In this FIG. 9, what are depicted by solid line 301 to solid line 306 are actual measurement values of the cases of resin film materials that have a thickness of 2 mm and are different from each other in the hardness. Furthermore, what are depicted by dashed line 401 to dashed line 406 are actual measurement values of the cases of resin film materials that have a thickness of 1 mm and are different from each other in the hardness. What are depicted by solid line 301 to solid line 306 and dashed line 401 to dashed line 406 are obtained by plotting the coefficient μ of kinetic friction with respect to the ratio δ/SR between the radius SR of the pen tip of the electronic pen 1 and the amount δ of sinking when three kinds of loads (writing pressures), 50 gf, 100 gf, and 200 gf, were applied to the electronic pen 1. This example is the case in which the core body 4 of the electronic pen 1 is composed of polyoxymethylene (POM) and the radius SR of the pen tip thereof is set to 0.7 mm (diameter is 1.4 mm).

In FIG. 10, a correspondence table of the resin film material and the thickness and hardness thereof regarding what are depicted by solid line 301 to solid line 306 and dashed line 401 to dashed line 406 is depicted.

As is understood from these FIG. 9 and FIG. 10, it turns out that the amount δ of sinking and the coefficient μ of kinetic friction become larger when the hardness of the resin film is lower and the amount δ of sinking and the coefficient μ of kinetic friction become smaller when the hardness of the resin film is higher. Furthermore, it turns out that the amount δ of sinking becomes larger when the thickness of the resin film is larger.

Moreover, it has turned out that, for example, when the hardness of the resin film layer 101 falls below A70, the amount δ of sinking with respect to the writing pressure becomes too large and the durability against pen writing is lowered. Furthermore, because the amount of displacement per load increases as the hardness becomes lower, it can be understood that, when the thickness is set smaller, the displacement gets saturated at earlier timing and it becomes more difficult to obtain the tendency represented in (expression A). In addition, for example, if the hardness of the resin film layer 101 surpasses A97, the amount δ of sinking with respect to the writing pressure becomes too small and the sense of writing is lowered particularly at the time of a low writing pressure.

In view of the above and the above-described target range Atg, it can be deemed that setting the hardness of the resin film layer 101 to, e.g., A70 or higher is essential from the standpoint of the durability and setting the hardness to e.g. A97 or lower is preferable from the standpoint of the sense of writing.

Furthermore, from a standpoint described below, the thickness of the resin film layer 101 is selected. Specifically, for example, in the case of the pen input device sheet 100 in which the amount δ of sinking when a load (writing pressure) of 50 gf is applied to the electronic pen 1 falls below 50 μm, it is difficult to feel the sense of writing particularly at the time of a low writing pressure. In addition, in the case of the pen input device sheet 100 in which the amount δ of sinking when a load (writing pressure) of 300 gf is applied to the electronic pen 1 falls below 100 μm, improvement in the sense of writing is hardly felt although a writing pressure is applied to the electronic pen 1. Moreover, in the case of the pen input device sheet 100 in which the amount δ of sinking surpasses 400 μm, the amount of sinking when a high writing pressure is applied becomes too large, which causes the lowering of the sense of writing.

Figure 11:
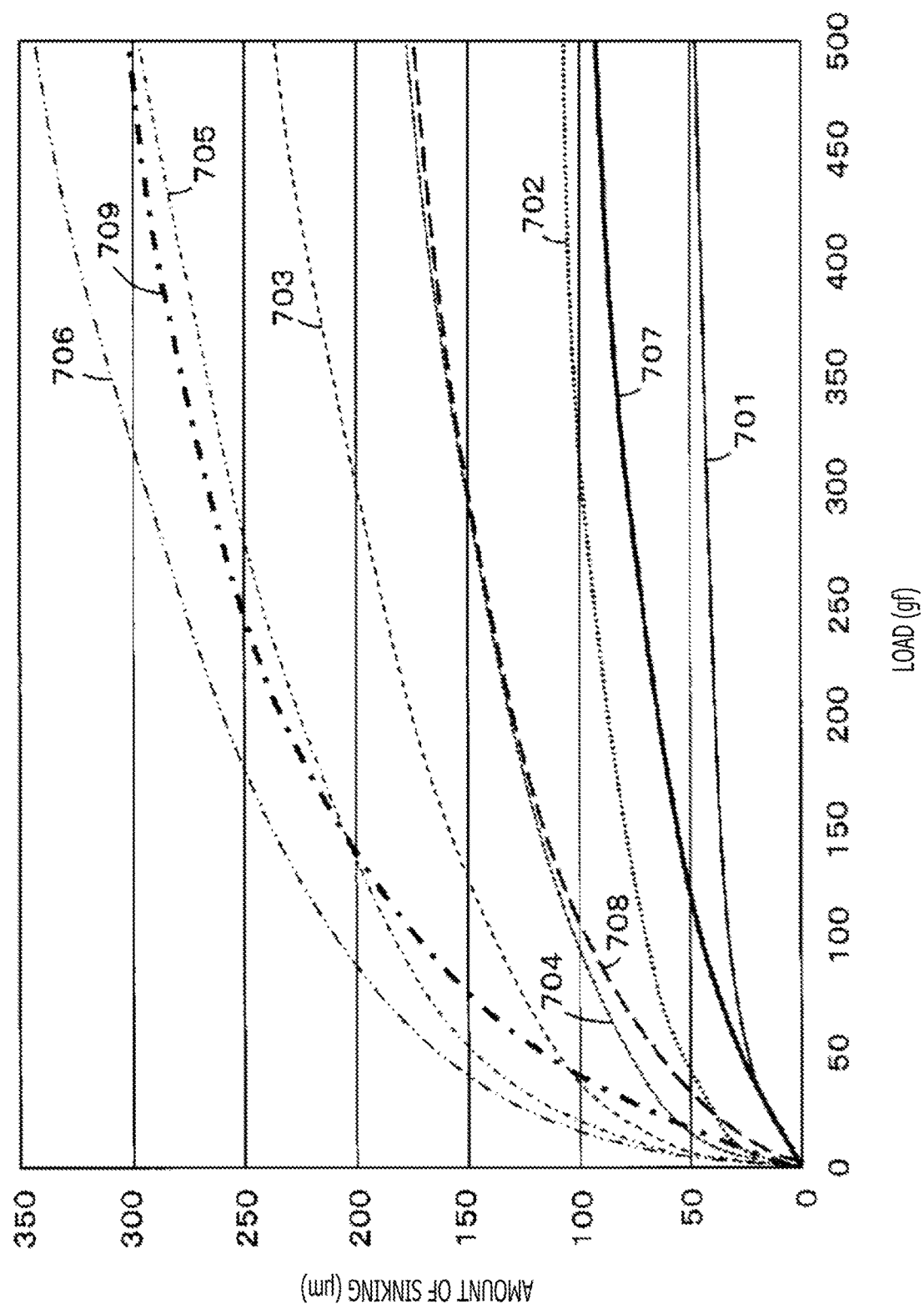
FIG. 11 is a diagram used for explaining the of a pen input device sheet according to an embodiment of this disclosure.

In FIG. 11, the relation between the thickness of the resin film and the thickness of paper and the amount of sinking due to a load is depicted. In this FIG. 11, a curve 701 indicates the case of one piece of paper. A curve 702 indicates the case of overlapping of two pieces of paper. A curve 703 indicates the case of overlapping of five pieces of paper. A curve 704 indicates the case of overlapping of ten pieces of paper. A curve 705 indicates the case of overlapping of 15 pieces of paper. A curve 706 indicates the case of overlapping of 20 pieces of paper. The overlapping of ten pieces of paper, the overlapping of 15 pieces of paper, and the overlapping of 20 pieces of paper are based on the assumption of the case in which, with a notebook, a writing block, or the like, a plastic sheet laid under paper of the writing target is not used and thus plural pieces of paper exist under this paper of the writing target.

Furthermore, a curve 707 indicates the case of a resin film whose film thickness is 100 μm. A curve 708 indicates the case of a resin film whose film thickness is 200 μm. A curve 709 indicates the case of a resin film whose film thickness is 350 μm. Here, resin urethane is employed as the material of the resin film and a film having hardness A92 is used. By this FIG. 11, the difference based on the thickness of the resin film and the number of pieces of paper can be compared. Furthermore, according to this FIG. 11, the resin film with which the amount of displacement surpassing that of the overlapping of two pieces of paper is obtained when a predetermined load (writing pressure of 50 to 300 gf in general writing) is applied is the resin film whose film thickness is 200 μm, which is the most ideal. Even with the resin film whose film thickness is 100 μm, the amount of displacement equivalent to that of one piece of paper is obtained and thus the feeling of writing equivalent to that to one piece of paper can be realized. Moreover, it will be possible to reproduce the feeling of writing to paper even with the resin film whose film thickness is 350 μm although it is impractical.

In view of the above, in this embodiment, it is preferable that the thickness of the resin film layer 101 of the pen input device sheet 100 be equal to or larger than 100 μm. Furthermore, because of balance with handling of equipment such as a tablet or a smartphone and the optical characteristics of the film, it is preferable that the thickness of the resin film layer 101 be equal to or lower than 500 μm. In this embodiment, the resin film layer 101 is selected to fall within a range of 150 to 350 μm, for example, as a more preferable range of the thickness.

From the above, the pen input device sheet 100 that provides the intended feeling of writing can be obtained by selecting (adjusting) the hardness and thickness of the resin film layer 101.

For example, in FIG. 9, when the target range ellipse Atg defined in the above description is selected as the range of the ratio between the amount δ of sinking and the radius SR of the pen tip with respect to an assumed change in the load (writing pressure) regarding the straight line TG with the intended proportional relation, the hardness and thickness of the resin film layer 101 are adjusted to fall within this range.

It turns out that the characteristics closest to the relation between paper and a ballpoint pen among a number of resin sheet layers depicted in FIG. 9 and FIG. 10 are the characteristics depicted by the dashed line 404 and the solid line 304. It is possible to fabricate an ideal resin sheet by further adjusting the thickness and hardness of the resin films corresponding to the characteristics depicted by the solid line 304 and the dashed line 404.

[Method for Manufacturing Pen Input Device Sheet]

Figure 12:
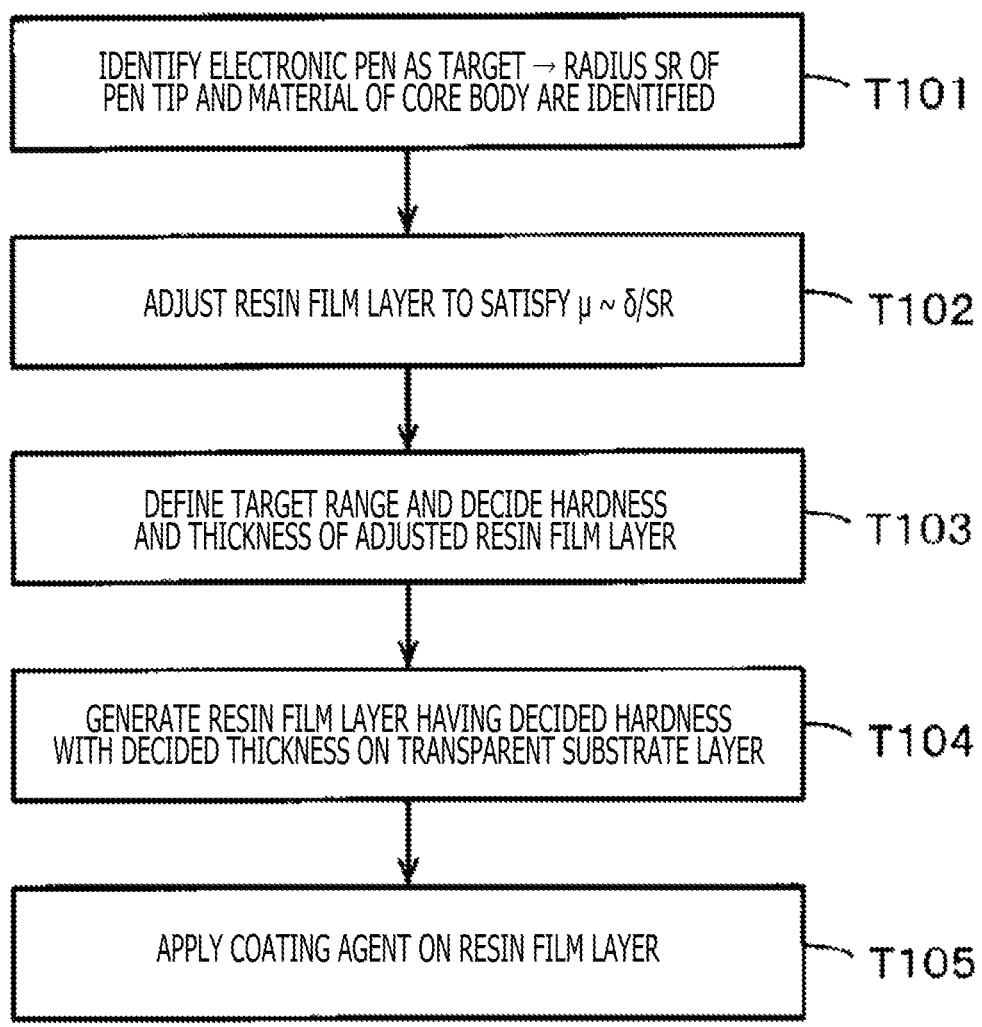
FIG. 12 is a diagram depicting a flowchart of a procedure for explaining a method for manufacturing a pen input device sheet according to an embodiment of this disclosure.

A method for manufacturing the pen input device sheet 100 explained above will be described with reference to a flowchart of FIG. 12 depicting one example of the flow of the procedure of the method.

First, the electronic pen 1 with which drawing is to be carried out on the pen input device sheet 100 of the embodiment is identified (selected) (procedure T101). By this identification of the electronic pen 1, the radius SR of the pen tip that is the tip part 4*a* of the core body 4 is identified. Furthermore, the material of the core body 4 is also identified. In this case, any material may be employed as the material of the core body 4 as long as it has higher hardness than the resin film layer 101. In this example, a hard resin, e.g. POM, is employed.

Next, the material of the resin film layer 101 is adjusted to satisfy the proportional relation of the above-described (expression A) (procedure T102). At this time, it goes without saying that SR in (expression A) is the radius of the pen tip of the tip part 4*a* of the core body 4 of the electronic pen 1 identified in the procedure T101 and δ in (expression A) is the amount of sinking of the pen tip of this electronic pen 1 in the resin film layer 101.

Next, the target range explained with use of FIG. 9 is defined and the hardness and thickness of the resin film layer 101 adjusted in the procedure T102 are decided (procedure T103).

Next, on the transparent substrate layer 103 with a predetermined thickness, the resin film layer 101 that has the hardness decided in the procedure T103 and has been adjusted in the procedure T102 is formed with the thickness decided in the procedure T103 (procedure T104).

Next, a coating agent is applied on the surface of the resin film layer 101 to adjust the feeling of writing in such a manner as to approximate the feeling of writing to that when writing is carried out on paper with a ballpoint pen (procedure T105). As described above, the procedure T105 may be absent if a characteristic that corresponds with or is close to the straight line TG depicted in FIG. 8 is obtained.

Through the above, the pen input device sheet 100 of this embodiment can be manufactured. Furthermore, as depicted in FIG. 5, when the pen input device sheet 100 is stuck to the display screen 202D of the display device 202, the optical adhesive layer 104 is applied on the transparent substrate layer 103 and the pen input device sheet 100 is stuck to the display screen 202D with the intermediary of this optical adhesive layer 104.

In the case of considering sticking of the pen input device sheet 100 of this embodiment to the display screen 202D of the display device 202 by the user oneself, e.g. a peelable sheet is stuck to the surface of the optical adhesive layer 104. Then, by peeling the peelable sheet, the optical adhesive layer 104 is exposed, which allows the sticking to the display screen 202D. If the pen input device sheet 100 is configured to include the optical adhesive layer 104 as above, the resin film layer 101 may be formed on the transparent substrate layer 103 after the optical adhesive layer 104 is stuck to the lower surface of the transparent substrate layer 103.

If the pen input device sheet 100 is configured to include the optical adhesive layer 104 as above, further convenience is obtained when the optical adhesive layer 104 is provided with a configuration of an optical adhesive layer that can be peeled again. That is, the pen input device sheet 100 becomes replaceable. Thus, by preparing sheets having various feelings of writing as this pen input device sheet 100, the user is easily enabled to carry out replacement by the pen input device sheet 100 with the desired feeling of writing.

[Working Example]

A working example of the pen input device sheet 100 manufactured in the above-described manner will be described. In the pen input device sheet 100 of this working example, the resin film layer 101 was composed of a polyurethane resin adjusted to satisfy the above-described (expression A) and the thickness was set to 190 μm and the hardness was set to A91. Furthermore, adjustment was carried out through application of an oil wax layer on this resin film layer 101 as the layer 102 of a coating agent.

FIG. 13 depicts actual measurement data that represents the feeling of writing when drawing was carried out on the pen input device sheet 100 of this working example with the electronic pen 1 in which the core body 4 was composed of POM and the radius SR of the pen tip of the tip part 4a of this core body 4 was set to SR=0.7 mm. In this FIG. 13, the actual measurement data depicted in FIG. 8 when writing was carried out on the paper with a ballpoint pen is also depicted for reference.

In this FIG. 13, pieces of actual measurement data 501, 502, and 503 of three points are actual measurement values when a load (writing pressure) of 50 gf, 100 gf, and 200 gf, respectively, was applied to the above-described electronic pen 1 on the pen input device sheet 100 of this working example. From this actual measurement data, it turns out that a characteristic on a straight line that has almost the same slope as the straight line TG of the proportional relation when writing was carried out on the paper with a ballpoint pen and exists at a position close to this straight line TG was obtained. There is room for allowing the interval between the straight line that links the pieces of actual measurement data 501, 502, and 503 of three points and the straight line TG to be set shorter by adjusting the layer 102 of the coating agent applied on the resin film layer 101.

In the above embodiment, the pen input device composed of the electronic pen 1 and the position detecting device 201 is a pen input device of the electromagnetic induction system. However, the pen input device sheet 100 of this embodiment can be applied irrespective of the detection system and can be applied also to a pen input device composed of an electronic pen and a position detecting device of a capacitive system, for example. In the case of the capacitive system, the core body of the electronic pen is composed of an electrical conductor. Also when the core body of this electronic pen of the capacitive system is composed of steel use stainless (SUS), which is an electrically-conductive metal, it is possible to provide a feeling of writing similar to that when writing was carried out on paper with a ballpoint pen by using the pen input device sheet 100 of the working example.

In FIG. 13, pieces of actual measurement data 601, 602, and 603 of three points are actual measurement values when a load (writing pressure) of 50 gf, 100 gf, and 200 gf, respectively, was applied to the above-described electronic pen of the capacitive system on the pen input device sheet 100 of this working example. In this case, the radius SR of the pen tip of the core body composed of SUS in this electronic pen was set to SR=0.5 mm. From this actual measurement data, it turns out that a characteristic on a straight line that has almost the same slope as the straight line TG of the proportional relation when writing was carried out on the paper with a ballpoint pen and substantially overlaps with this straight line TG was obtained.

[Effects of Embodiment]

As described above, according to the pen input device sheet of this embodiment, when operation input is carried out for position indication with an electronic pen with application of a predetermined load (writing pressure) while the electronic pen is brought into contact with this pen input device sheet, the user can realize a feeling of writing similar to that when writing is carried out on paper with a ballpoint pen.

Furthermore, according to the pen input device sheet of this embodiment, recesses and protrusions are not formed on the surface of the sheet differently from Patent Document 1 and Patent Document 2. Therefore, the display quality of the screen is not deteriorated when this pen input device sheet is stuck onto the display screen of a display. Furthermore, the pen input device sheet of this embodiment has a configuration that causes the feeling of writing to appear by including the resin film layer having the characteristic of (expression A) and thus the thickness can be easily set to a predetermined value or larger. In addition, also regarding the amount of sinking of the pen input device sheet based on the writing pressure applied to the electronic pen, the amount that contributes to the feeling of writing can be sufficiently obtained. Thus, the effect of pen catching generated based on this amount of sinking is sufficiently obtained and an effect that it is also possible to obtain a feeling of writing like that to e.g. pieces of paper overlapped in order to generate a sense of resistance by the friction force of the material is provided.

[Other Embodiments and Modification Examples]

In the above embodiment, as an example of the feeling of writing to which the feeling of writing with the electronic pen is brought close, the feeling of writing when writing is carried out on copy paper as an example of paper with a ballpoint pen as an example of a writing material is cited. However, it goes without saying that the paper is not limited to the copy paper and the writing material is not limited to ballpoint pen. For example, as the paper, various kinds of paper, such as notebook paper, drawing paper, Japanese calligraphy paper, Japanese paper, and cardboard, can be deemed as the target. Furthermore, as the writing material, various kinds of writing materials, such as pencil, mechanical pencil, and fountain pen, can be deemed as the target.

Moreover, the medium of the writing target with which a feeling of writing is caused to appear is not limited to the paper. In short, any medium other than paper may be employed as long as it is a medium having a characteristic with which an approximate straight line of plotted data satisfies the proportional relation of (expression A).

In the above-described embodiment, the resin film layer 101 is formed on the transparent substrate layer 103. However, it is also possible to omit the transparent substrate layer 103 and the adhesive layer 104 by forming the resin film layer 101 on the display screen of a display device.

Furthermore, in the above-described embodiment, the pen input device sheet is provided on the display screen of a display device. However, it goes without saying that the pen input device sheet according to this disclosure is not limited to the case in which the pen input device sheet is provided on the display screen of a display device. In this case, the resin film layer 101 can be formed on a substrate layer that is not transparent. Furthermore, the adhesive layer also does not need to be a transparent adhesive layer for an optical film. Moreover, the coating agent that forms the coating layer 102 also does not need to be a transparent material.

It is to be noted that the embodiment of the present disclosure is not limited to the foregoing embodiments, and that various changes can be made without departing from the spirit of the present disclosure.

What is claimed is:

1. A pen input device sheet that contacts a tip part of a core body of an electronic pen for a pen input device that detects a position indicated by the electronic pen, the pen input device sheet comprising:
   an adhesive layer; and
   a resin film layer disposed on the adhesive layer, wherein:
      SR is a diameter of the tip part of the core body of the electronic pen,
      $\delta$ is an amount of sinking of the resin film layer that changes according to a load applied by the tip part of the core body of the electronic pen when the tip part of the core body of the electronic pen is in contact with the pen input device sheet,
      $\mu$ is a coefficient of kinetic friction between the resin film layer and the tip part of the core body that changes according to the load applied by the tip part of the core body of the electronic pen when the tip part of the core body of the electronic pen is in contact with the pen input device sheet, and
      when the load applied to the tip part of the core body is changed and corresponding measurements of $\mu$ and $\delta$ are taken, and the measurements of $\mu$ and $\delta$ are plotted with $\mu$ allocated to an ordinate axis and a ratio of $\delta$/SR is allocated to an abscissa axis, a fitted straight line plotted based on the measurements has a proportional relation corresponding to a proportional relation between $\mu$ and the ratio of $\delta$/SR.

2. The pen input device sheet according to claim 1, wherein
   the proportional relation corresponds to a relation while drawing is carried out on paper with a writing implement having a tip part with a diameter of SR.

3. The pen input device sheet according to claim 1, wherein
   the resin film layer is a self-restoring soft resin layer.

4. The pen input device sheet according to claim 3, wherein
   the resin film layer includes an urethane resin.

5. The pen input device sheet according to claim 1, wherein
   at least one of: a hardness and a thickness of the resin film layer is selected such that a change range of the ratio $\delta$/SR corresponding to a change range of the load becomes a predetermined range.

6. The pen input device sheet according to claim 1, wherein
   the coefficient $\mu$ of kinetic friction is in a range of $0.1 \leq \mu \leq 0.4$ and the ratio $\delta$/SR is in a range of $0.01 \leq \delta/SR \leq 0.5$ in the proportional relation.

7. The pen input device sheet according to claim 1, wherein
   a coating agent containing sebum is disposed on the resin film layer.

8. The pen input device sheet according to claim 7, wherein
   the coating agent is configured to be applied more than once.

9. The pen input device sheet according to claim 7, wherein
   while the coating agent is disposed on the resin film layer, the proportional relation is a desired proportional relation.

10. The pen input device sheet according to claim 1, wherein
    a transparent substrate layer is disposed on a side of the resin film layer that is opposite to a side of the resin film layer that is closest to a surface with which the tip part of the core body of the electronic pen contacts the resin film layer.

11. The pen input device sheet according to claim 1, wherein
    the adhesive layer is disposed on a side of the resin film layer opposite to a side of the resin film layer that is closest to a surface with which the tip part of the core body of the electronic pen contacts the resin film layer.

12. The pen input device sheet according to claim 1, wherein
    a transparent substrate layer is disposed on a side of the resin film layer opposite to a side of the resin film layer that is closest to a surface with which the tip part of the core body of the electronic pen contacts the resin film layer, and the adhesive layer is disposed on the transparent substrate layer on a side of the transparent substrate layer opposite to a side of the transparent substrate layer that is adjacent to the resin film layer.

13. The pen input device sheet according to claim 11, wherein
    the adhesive layer is configured to be peeled more than once.

14. The pen input device sheet according to claim 1, wherein
    the pen input device detects the position indicated by the electronic pen based on an electromagnetic induction system.

15. The pen input device sheet according to claim 1, wherein
    the pen input device detects the position indicated by the electronic pen based on a capacitive system.

16. A method for manufacturing a pen input device sheet that contacts a tip part of a core body of an electronic pen, the method comprising:
    obtaining a value of a diameter SR of the tip part of the core body of the electronic pen;
    obtaining a plurality of values of an amount of sinking $\delta$ of a resin film layer included in the pen input device sheet that changes according to a plurality of loads applied by the tip part of the core body of the electronic pen when the tip part of the core body of the electronic pen is in contact with the pen input device sheet;
    obtaining a plurality of values of a coefficient $\mu$ of kinetic friction between the resin film layer and the tip part of the core body that changes according to the plurality of loads applied by the tip part of the core body of the electronic pen when the tip part of the core body of the electronic pen is in contact with the pen input device sheet;

plotting the values of $\mu$ and $\delta$ with $\mu$ allocated to an ordinate axis and a ratio of $\delta/SR$ is allocated to an abscissa axis;

plotting a fitted straight line based on the values allocated to the ordinate axis and the abscissa axis; and adjusting the resin film layer included in the pen input device sheet such that the fitted straight line based on the values allocated to the ordinate axis and the abscissa axis has a proportional relation corresponding to a proportional relation between $\mu$ and the ratio of $\delta/SR$.

17. The method according to claim 16, further comprising:

selecting at least one of: a hardness and a thickness of the resin film layer such that a change range of the values of the ratio $\delta/SR$ corresponding to a change range of the load becomes a predetermined range.

18. The method according to claim 16, further comprising:

applying a coating agent containing sebum on the resin film layer.

19. The method according to claim 18, wherein
after the coating agent is applied, the proportional relation is a desired proportional relation.

\* \* \* \* \*